US011835881B2

(12) United States Patent
Sato

(10) Patent No.: US 11,835,881 B2
(45) Date of Patent: Dec. 5, 2023

(54) IMAGE FORMING APPARATUS WITH SWITCHED PROCESS SPEEDS AND RESOLUTIONS

(71) Applicant: CANON KABUSHIKI KAISHA, Tokyo (JP)

(72) Inventor: Tomonori Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/841,599

(22) Filed: Jun. 15, 2022

(65) Prior Publication Data

US 2022/0413412 A1 Dec. 29, 2022

(30) Foreign Application Priority Data

Jun. 28, 2021 (JP) ................................ 2021-106948

(51) Int. Cl.
*G03G 15/04* (2006.01)
*G02B 26/12* (2006.01)
*G03G 15/043* (2006.01)

(52) U.S. Cl.
CPC ..... *G03G 15/04072* (2013.01); *G02B 26/124* (2013.01); *G03G 15/043* (2013.01); *G03G 15/0435* (2013.01); *G03G 2215/0404* (2013.01)

(58) Field of Classification Search
CPC ......... G03G 15/04072; G03G 15/0435; G03G 15/043; G03G 21/14; G03G 15/5008; G03G 15/0266; G03G 15/1675; G03G 15/168; G03G 2215/0404; G03G 2215/1661; G02B 26/124
See application file for complete search history.

(56) References Cited

U.S. PATENT DOCUMENTS 10,520,848 B2 12/2019 Ishida et al. ......... G03G 15/043
2019/0064692 A1 2/2019 Wakamiya ........... G03G 15/043

FOREIGN PATENT DOCUMENTS

| JP | 2008-012694 | 1/2008 |
| JP | 2009-018484 | 1/2009 |
| JP | 4389495 B2 | 12/2009 |
| JP | 2015-009485 | 1/2015 |
| JP | 2019-038219 | 3/2019 |
| JP | 2019-070755 | 5/2019 |

OTHER PUBLICATIONS

Extended European Search Report dated Dec. 5, 2022 in counterpart EP Application No. 22180445.3.

*Primary Examiner* — Walter L Lindsay, Jr.
*Assistant Examiner* — Geoffrey T Evans
(74) *Attorney, Agent, or Firm* — Venable LLP

(57) ABSTRACT

An image forming apparatus includes a scanning means provided with a light source, a polygon mirror and a driving means for driving rotation of the polygon mirror; a photosensitive member, a developing means, and a detecting means for detecting a laser light from the light source. A controller controls to execute a light emission operation so that an area including an image forming area of the photosensitive member is irradiated with the laser light. The controller controls to execute a switching operation in which a rotational speed of the polygon mirror is switched from a first speed to a second speed different from the first speed. The controller controls to execute the light emission operation in a state in which the photosensitive member and the developing means are in contact and are rotating, and to execute the switching operation based on a detecting result of the detecting means in the light emission operation.

14 Claims, 13 Drawing Sheets

IMAGE FORMING APPARATUS WITH SWITCHED PROCESS SPEEDS AND RESOLUTIONS

FIELD OF THE INVENTION AND RELATED ART

This invention relates to an image forming apparatus, for example, the image forming device provided with a rotating polygon mirror by which a laser light is scanned on a photosensitive member.

DESCRIPTION OF THE RELATED ART

Conventionally, it is necessary to switch the rotational speed of a scanner motor, in the case of the printing operation with mixed several process speed and resolution levels in printing on a variety of medium continuously. In this case, the printing operation is paused and then the rotational speed of the scanner motor is switched. The image forming apparatus like this has the technology which detects the rotational speed by forcing to emit laser light (hereinafter referred as a forced emission) for a certain duration at the time the scanner motor starts up is well-known. For example, in Japanese Laid-Open Patent Application 2019-038219 the technology which shortens the first print-out time within the restriction the laser light is forced to emit only in the state the developing means is separated from the photosensitive drum has been disclosed.

On the other hand, a number of the cases that print with mixed process speed and resolution levels in order to print on a variety of medium all at once are growing. However, switching the rotational speed of the scanner motor takes time in printing with the several process speed. For this problem, which switching the rotational speed takes time, this technology has been disclosed for example in Japanese Patent 4389495. In Japanese Patent 4389495, in the case of printing reservation with different process speed, by replacing the order of reservation in order to reduce to the least number of switching speed or by printing at the slowest speed in the reservation, the decline of whole productivity is minimized.

However, the problem that it takes time to switch rotational speed of the scanner motor with forced emission is still found. The switching operation takes time is because it is necessary to pause driving the member that pertains to forming images or to separate the developing means from the photosensitive drum during switching rotational speed of the scanner motor with the forced emission.

SUMMARY OF THE INVENTION

In the above situation, the objective of this invention is to shorten the time for switching rotational speed of the scanner motor with the force emission.

Above objective is attained in the image forming apparatus relates/pertains to this invention. To abstract the representative component of this disclosure includes an image forming apparatus comprising: a scanner provided with a light source, a rotating polygon mirror for deflecting a laser light emitted from said light source, and a first driving motor for driving rotation of said rotating polygon mirror; a photosensitive member on which an electrostatic latent image is formed by the laser light emitted from said scanner; a developing member for developing the electrostatic latent image formed on said photosensitive member with toner to form a toner image; a detector for detecting the laser light; and a controller for controlling said scanner and the first driving motor, wherein said controller controls said light source to execute a light emission operation so that an area including an image forming area of said photosensitive member is irradiated with the laser light emitted from said light source, wherein said controller controls said first driving motor to execute a switching operation in which a rotational speed of said rotating polygon mirror is switched from a first rotational speed to a second rotational speed different from the first rotational speed; and wherein said controller controls said light source to execute the light emission operation in a state in which said photosensitive member and said developing member are in contact with each other and are rotating, and said controller controls to execute the switching operation based on a detecting result of said detector in the light emission operation.

Further features of the present invention will become apparent from the following description of exemplary embodiments with reference to the attached drawings.

DESCRIPTION OF THE EMBODIMENTS

Hereinafter, the embodiment of present invention will be illustratively described in detail with referring the drawings. However, sizes, materials, shapes, and relative positioning of component parts written in this embodiment should be properly changeable in a variety of condition and/or a structure of an apparatus to which present invention apply. This invention is not limited within these embodiments below.

In the embodiment 1, a multi-color image forming apparatus with an intermediate transfer will be described as an example. The multi-color image forming apparatus with the intermediate transfer forms multi-color images, by transferring a toner image on a photosensitive drum onto an intermediate transfer belt (intermediate transfer member) once (hereinafter 'a first transfer'), and then transferring an image from the intermediate transfer belt onto a recording media (hereinafter 'a second transfer')

Description of the Apparatus

Figure 1:
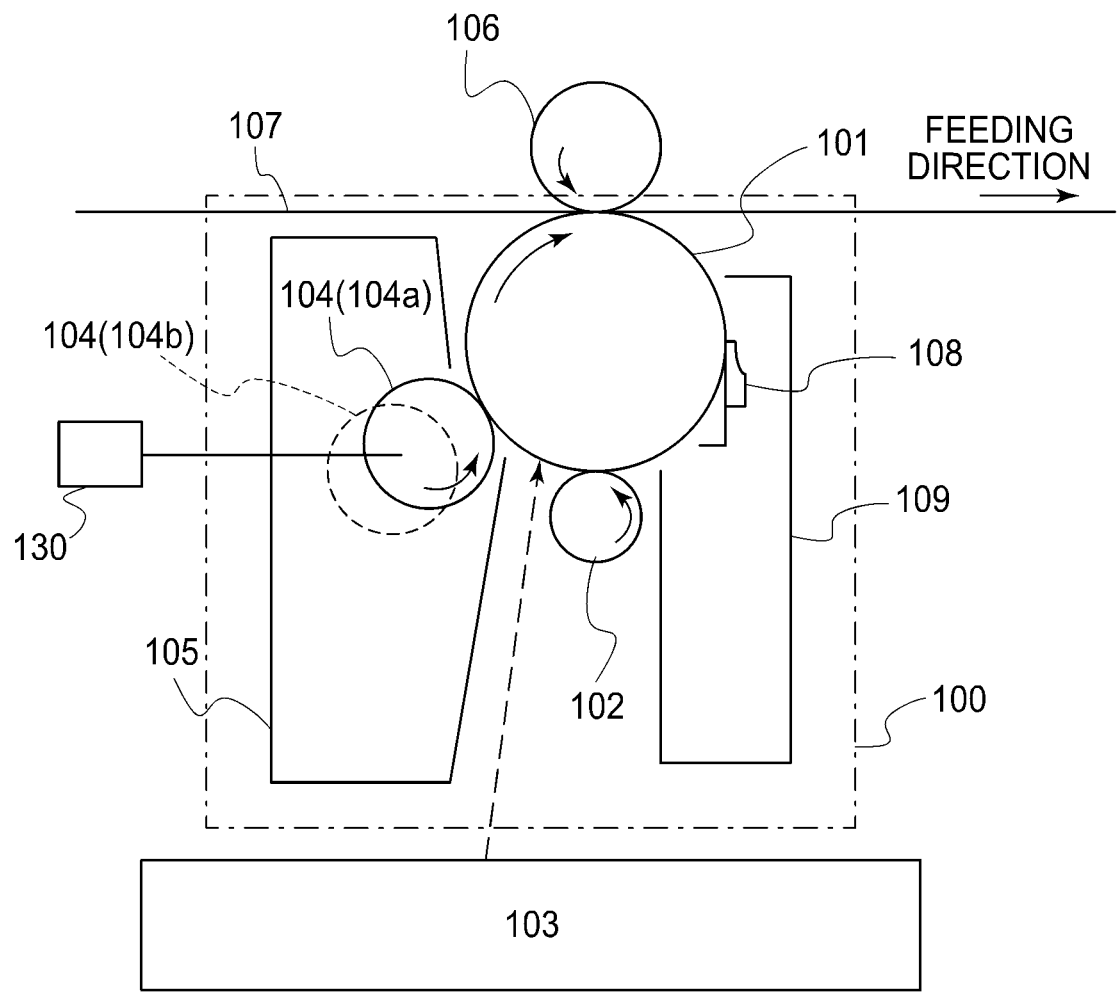
FIG. 1 is a cross sectional view of main part of a cartridge according to the embodiments 1-5.
Figure 2:
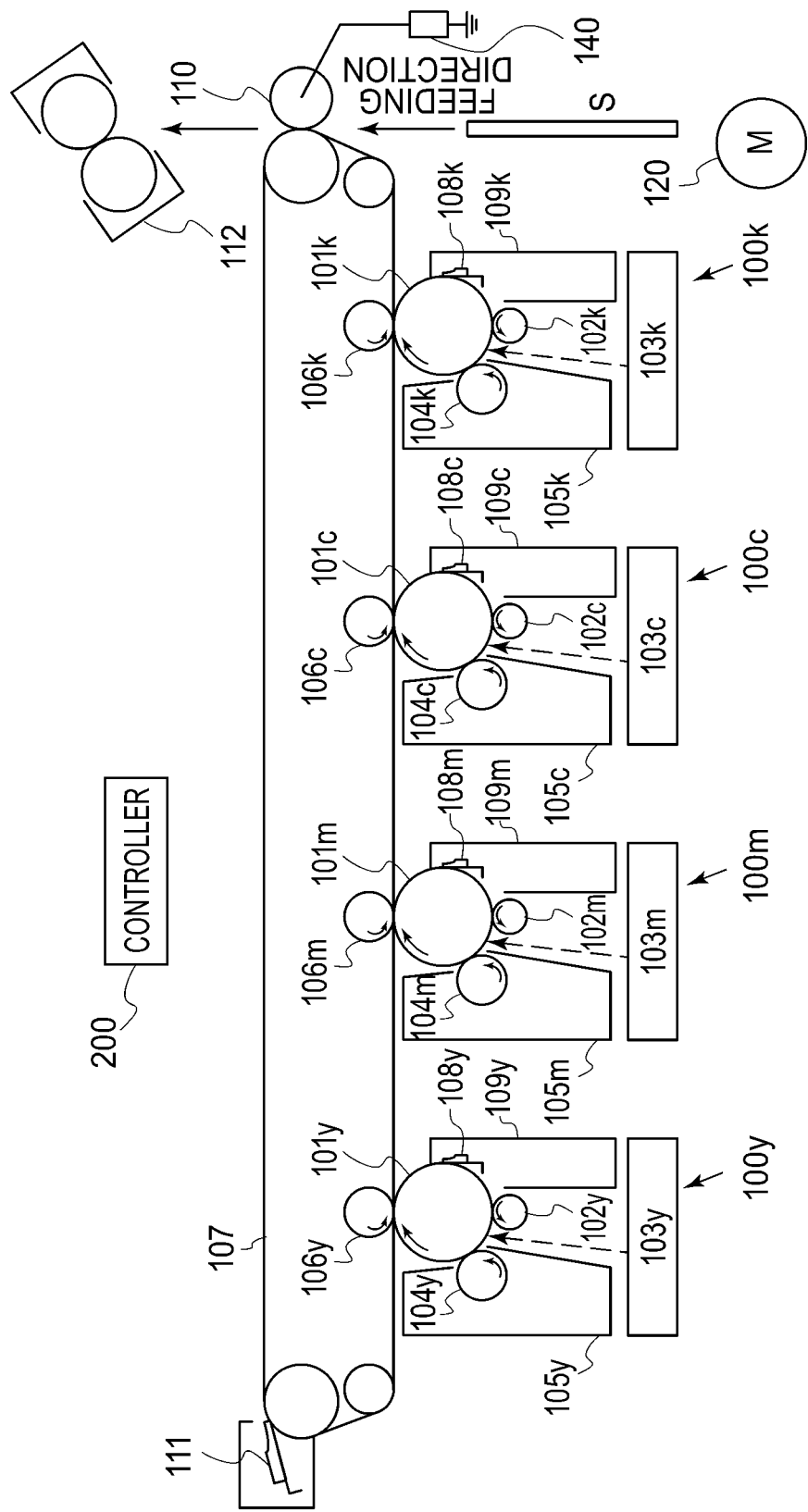
FIG. 2 is a cross sectional view of the main part of an image forming apparatus.

First off, an image forming process will be described with the cross-sectional diagram in FIGS. 1 and 2. A charging roller 102 is in contact with a surface of a photosensitive drum 101 as a photosensitive member.

The charging roller 102 charges the photosensitive drum at an uniform (even) electric potential by applying a charging voltage (charging process). A scanner unit 103 forms an electrostatic latent image on the surface of the photosensitive drum 101 charged a voltage (latent process). A developing roller 104 which is a developing means (developing member) is in contact with the photosensitive drum 101. By applying a developing voltage, the developing roller 104 develops an electrostatic latent image on the photosensitive drum 101 with toner and forms a toner image (developing process). The developing roller 104 is accommodated in a developing container 105 which has toner inside. The developing roller 104 and the photosensitive drum 101 are controlled between in a first state wherein both members are in contact with each other and in a second state wherein both members are separating from each other by a contact and separation structure 130 as a contact and separation means. Also, the developing roller 104 and the photosensitive drum 101 are rotated by a driving motor 120 which is a second driving means. Feeding a recording material S is operated by a feeding roller (not shown in the Figures) which is a feeding means located on a feeding route (not shown in the Figures). The feeding roller (not shown in the Figures) is driven by the driving motor 120 as well.

A first transfer roller 106 which is a first transfer means (a first transfer member) is pressed on the photosensitive drum 101 through an intermediate transfer belt 107 which is a nipping feeding member. The first transfer roller 106 transfers a toner image onto the intermediate transfer belt 107 by applying a first transfer voltage in a first transfer voltage applying means (a first transfer voltage applying portion) (not shown) (first transfer process). The toner left on the photosensitive drum 101 is moved onto a drum cleaning blade 108 which is an image carrier cleaning means by rotation of the photosensitive drum 101 and removed from the photosensitive drum 101. The drum cleaning blade 108 is accommodated in a wasted toner container 109 with the cleaned toner. In the embodiment 1, the assembly comprises: the photosensitive drum 101, the charging roller 102, the developing roller 104, the developing container 105, the drum cleaning blade 108, and, the wasted toner container 109, is a cartridge 100.

In the case of image forming process described above with several colors, for example four colors, is operated in order of; yellow (y), magenta (m), cyan (c), and black (b), and then a multi-colored image is formed on the intermediate transfer belt 107. In FIG. 2, each color is shown as 101y, 101m, 101c, and 101b, about the photosensitive drum 101 for example. In FIG. 1 only the main parts of the cartridge 100 is described, so that those color cords (y, m, c, and k) at the end of each number are not shown. Also hereinafter, the color code at the end of numbers will be omitted except in the case when a member of the specific color will be described.

The multi-colored image formed as described above is transferred by a second intermediate transfer roller 110 as a second transfer means (a second transfer member) onto a recording material S conveyed along the feeding direction from a paper supplier cassette (not shown) (second transfer process). A second transfer voltage is applied to the second transfer roller 110 from a second transfer voltage resource 140 as the second transfer voltage applying means (the second transfer voltage applying portion). The second transfer voltage resource 140 is able to apply a positive voltage and a negative voltage as well. A fixing unit 112 fixes an unfixed toner image on the recording material S as a permanent image (fixing process). The toner left on the intermediate transfer belt 107 in the second transfer process is removed from the intermediate transfer belt 107 by a belt cleaning blade 111 as a cleaning means of an intermediate transfer member. These operations described above are controlled by a control unit 200.

<Scanner Unit>

Figure 3:
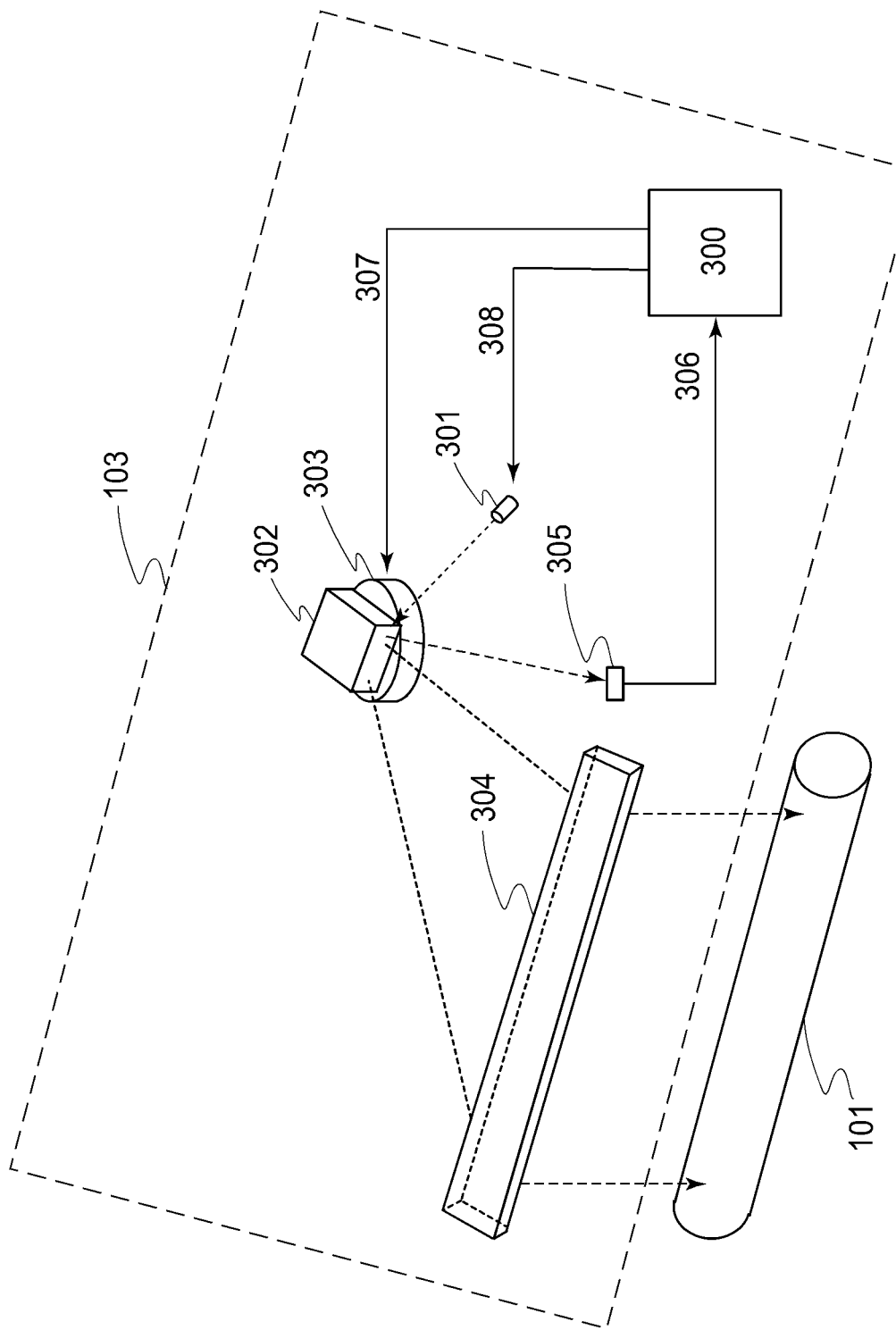
FIG. 3 is an explanatory drawing of the structure a scanner unit according to the embodiments 1-5.

Next, the scanner unit 103 will be described with FIG. 3. The scanner unit 103 includes a laser 301 which is a light resource emitting a laser light, a rotating polygon mirror 302 which deflects the laser light, and a scanner motor 303 which is the first drive means driving the rotating polygon mirror 302 to rotate. The laser 301, the rotating polygon mirror 302, and the scanner motor 303 work as a scanning means. The rotating polygon mirror 302 scans periodically on the photosensitive drum 101 (on the photosensitive member) with reflecting the laser light omitted from the laser 301 and passing by a reflection mirror 304.

The scanner unit 103 is provided with a BD (beam detector) 305 which is a detecting means. The BD 305 sends a main scan synchronizing signal 306 when the laser light is emitted to the position of the BD 305. A main scan synchronizing signal 306 is used for detecting a rotate period of the rotating polygon mirror 302 and as a guide to decide the starting position of an image formation in the main scan direction. A main scan direction is meaning the direction which the laser light is scanned. Also, the direction which crosses a main scan direction is called a sub scan direction.

The scanner unit 103 is provided with an ASIC 300 which is a control means controls the scanner unit 103. The ASIC 300 communicates with a CPU (not shown) which a control unit 200 includes, and controls the scanner unit 103 by directions from the CPU. The ASIC is input the main scan synchronizing signal 306 which is the result of detecting the laser light by the BD 305. When the ASIC 300 receives the main scan synchronizing signal 306, The ASIC 300 outputs a scanner motor driving signal 307 which drives the scanner motor 303 to rotate and a laser light driving signal 308 which turns on the laser 301. As described above, the ASIC 300 controls the rotating speed based on the detecting result of the BD 305.

A rotational speed control operation is started when the CPU receives a start-printing command sent from an outer apparatus such as a personal computer. The scanner motor 303 starts to drive in an accelerating mode in the required rotational acceleration when the rotational speed control starts. After some period of time since the rotational speed control operation starts, the ASIC 300 continuously emits the laser 301 and counts the number of rotations of the rotating polygon mirror 302 based on the main scan synchronizing signal 306 output by the BD 305. In the other words, the ASIC 300 performs a detecting operation (hereinafter referred as a forced emission) which detects the laser light in the state at least a part of the laser light exposed within an image forming area on the photosensitive drum 101. Note that, in present invention the image forming area is the area in which is able to be formed an image by exposing a laser light onto the photosensitive drum 101 along the longer side direction of the apparatus. The longer side direction is same direction of an axis of the rotation of the photosensitive drum 101 and a main scan direction as well.

When a number of rotations (rotational speed) of the scanner motor 303 reaches the targeted number of the rotations (targeted rotational speed), the ASIC 300 switches the operation from the rotational speed control operation to an emission control operation which the laser 301 emits onto outside of the image forming area. The emission control operation outside of the image forming area controls to emit only near by the BD 305 outside of the image forming area, not inside of the image forming area on the photosensitive drum 101. The reason why emitting in the forced emission is operated in the image forming area (the area including the image forming area) is because it is hard to emit with aiming outside of the image forming area only since the number of rotations of the scanner motor 303 constantly changes during the transition to reach to the targeted number of rotations. The forced emission is necessary not only for the time of acceleration when the rotation control operation starts, but, for example, for the time of acceleration and deceleration when the scanner motor 303 switches the targeted number of rotations as well.

An image forming apparatus in the embodiment 1 is operated at a secondary process speed of 200 mm/second in the case of feeding light weight paper such as plain paper. On the other hand, an image forming apparatus in the embodiment 1 is operated at a primary process speed of 140 mm/second which is slower than the secondary process speed in the case of feeding heavy weight paper such as thick paper. The rotational speed of the scanner motor 303 operated in the secondary process speed is 35433 rpm which is a second rotational speed. On the other hand, the rotational speed of the scanner motor 303 operated in the primary process speed is 24803 rpm which is a first rotational speed and is different from the secondary rotational speed. Note that, the effect of present invention is not limited with two rotational speed of the scanner motor 303. The same effect is provided when at least two rotational speed of the scanner motor 303 are included. The ASIC 300 and a control unit 200 are able to communicate each other. The ASIC 300 executes the emission control operation of the laser 301 and the rotational speed control operation of the scanner motor 303 by a command from the control unit 200.

The Operation of the Embodiment 1

The switching operation of the process speed in the embodiment 1 will be described with the chart in FIG. 4.

The operation to switch the number of rotation of the scanner motor 303 with the forced emission, without separation between the photosensitive drum 101 and the developing roller 104 and/or pausing the driving motor 120 during the continuous printing from on thick paper to on plain paper, will be described as an example. FIG. 4 (i) shows the image forming process described above of such as a Y latent process. Y, M, C, and K indicates the process of each color. FIG. 4 (ii) shows the rotational speed (such as 24803 rpm) and the state (such as accelerating, forced emission) of the scanner motor 303 in the scanner unit 103 of each color. FIG. 4 (iii) shows the first transfer voltage (such as +560 v) and FIG. 4 (iv) shows the second transfer voltage (such as +700 v). FIG. 4 (v) shows the process speed (such as 140 mm/s) and the state (such as switching speed) of the driving motor 120. FIG. 4 (vi) shows the state of the contact/separation structure 130 (such as the state of the developing contact). The horizontal axis shows the time.

Figure 4:
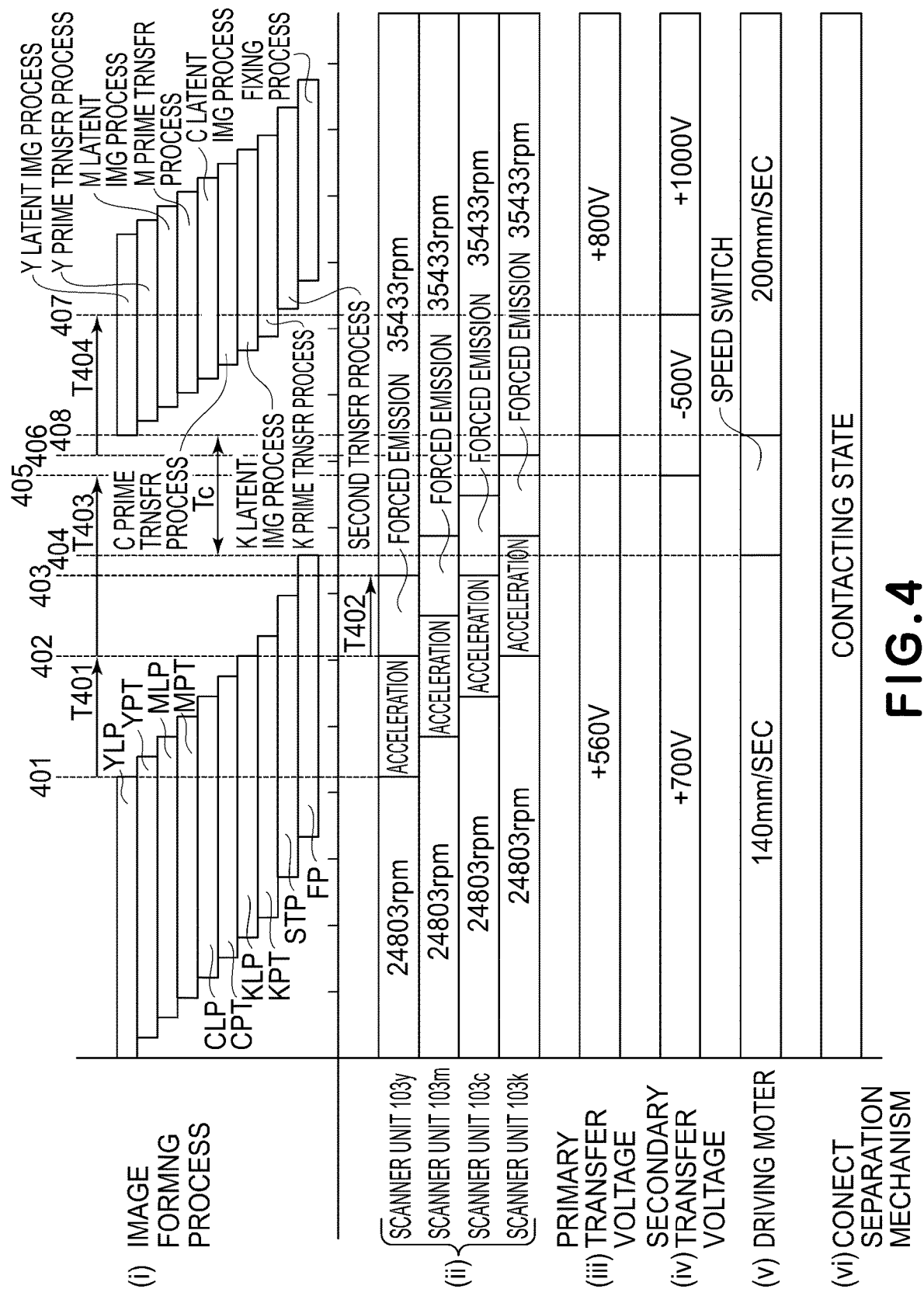
FIG. 4 is a timing chart indicates a switching operation according to the embodiment 1.

Above the timeline in the chart of FIG. 4 shows the operating timing of the image forming process which is used for explanation. The beginning half shows the image forming process on the thick paper and the latter half shows the image forming process on the plain paper.

As described above, the image forming process is operated in order of the charging process, the latent process, the developing process, the first transfer process, the second transfer process and the fixing process. Note that, the charging process and the developing process are omitted from the chart in FIG. 4.

Each image forming process will be described. The Y latent process in the chart indicates a period of time in which the laser light is exposed to form an image on a photosensitive drum of yellow 101y. The Y first transfer process in the chart indicates a period of time in which the toner is transferred to a intermediate transfer belt 107y on the photosensitive drum of yellow 101y. Followed by magenta, cyan, and black as well. The second transfer process in the chart indicates a period of time in which the multi-color toner image formed on the intermediate transfer belt 107 is transferred onto the recording material S. The fixing process in the chart indicates a period of time in which the toner image transferred onto the recording material S is fixed. The faster process speed, the shorter time for each process done, so that the time of the image forming process on the plain paper is shorter, compared with the image forming process on the thick paper.

Below the timeline in the chart indicates the state of operation of each member. The scanner unit 103 of each color indicates a period of time that the scanner motor 303 operates the forced emission and the number of rotations of the scanner motor 303. The first transfer voltage and the second transfer voltage indicate the voltage applied and a period of time of applying. The driving motor 120 indicates a driving process speed and a period of time of switching speed. The contact/separation structure 130 indicates the state that the developing roller 104 and the photosensitive drum 101 are separated.

<Switching Process Speed>

The operation of switching process speed starts at the timing 401 when the latent process of yellow ends. First, at the timing 401 when the latent process of yellow ends the rotational speed of a scanner motor 303y is accelerated from 24803 rpm to 35433 rpm and the switching operation is executed. At the timing 402 when the time T401 has passed since the acceleration starts at the timing 401 the laser 301 starts the forced emission. The time T401 is supposed that from the beginning of acceleration to the time which the rotational speed of the scanner motor 303 reaches for example to −10 percent of the targeted rotational speed even on condition with the slowest speed and is decided by the experiments. After the timing 402 which the forced emission is started the scanner motor 303 reaches to the targeted rotational speed 35433 rpm while the time T402 has passed and the forced emission ends at the timing 403. Followed same operation by in order of magenta, cyan, and black as well. The driving motor 120 starts acceleration to switch the process speed from 140 mm/s to 200 mm/s at a timing 404 when the fixing process onto the thick paper is completed (switching speed).

On the other hand, the develop roller 104 and the photosensitive drum 101 are in contact with each other so that a toner image is formed on a photosensitive drum 101y by the forced emission from the timing 402 when the forced emission by the scanner motor 103y starts. During this time the first transfer voltage (for example +560 v) that is same polarity with the voltage applied to form an image on the thick paper is applied to the first transfer roller 106. Thus, the formed toner image is transferred to the intermediate transfer belt 107 and reaches to the second transfer belt 110 at the timing 405 after the time T403 has passed since the timing 402 when the forced emission starts. Note that, the applied voltage is not limited within the value in the embodiment 1, but the voltage which is enough to transfer a toner image to the intermediate transfer belt 107 is possible.

If the same polarity voltage (for example +700 v) is kept applying as the voltage to form an image when a toner image reaches to the second transfer roller, the toner is put on the second transfer roller.

The toner deposit on the second transfer roller will be a backside soil on the plain paper which will be printed next. Here a backside soil is meaning a phenomenon which the recording material S put contamination on the back side of the surface where a toner image formed on.

To avoid above, from the timing 405 when the toner image of yellow reaches to the second transfer roller 110, the opposite polarity (for example, negative polarity) voltage (for example, −500 v) of the voltage (for example, positive polarity) applied to form an image is applied. By applying an opposite voltage, toner deposition on the second transfer roller 110 is prevented. A toner image keeps moving on to reach to the second transfer roller 110 from the timing 406 which the forced emission of black ends to the timing 407 which the time T404 has passed. Therefore, between the timing 405 and the timing 407 the opposite polarity voltage is necessary to keep on being applied. In the other word, during the toner image on the intermediate transfer belt 107 (on the intermediate transfer member) passes by the second transfer roller 110, the opposite polarity voltage is necessary to keep on being applied to the second transfer roller 110. After passing the second transfer roller 110, the toner on the intermediate transfer belt 107 is removed by a belt cleaning blade 111. Note that, the mechanism described below is possible as a means to avoid toner deposition on the second transfer roller 110: the contact/separation structure is additionally provided in between the second transfer roller 110 and the intermediate transfer belt 107 and the contacting/separating structure operates temporary separation of the second transfer roller 110 from the intermediate transfer belt 107.

The image forming process of the plain paper starts at the timing 408 when the switching operation of the driving motor 120 is completed. The first transfer voltage is switched to the voltage (for example, +800 v) which is applied for the plain paper at the same timing 408. The image forming process of the plain paper is same as the image forming process of the thick paper except the rotational speed of the scanner motor 35433 rpm, the process speed 200 mm/s, the first transfer voltage +800 v, and the second transfer voltage +1,000 v. The time in between the timing 404 which the fixing process is completed before the switching the rotational speed of the scanner motor 303 and the timing 408 which the latent process starts after the switching speed is defined as the switching time Tc. In the embodiment 1 the switching time Tc is 0.9 seconds.

The Effect of the Embodiment 1

Figure 5:
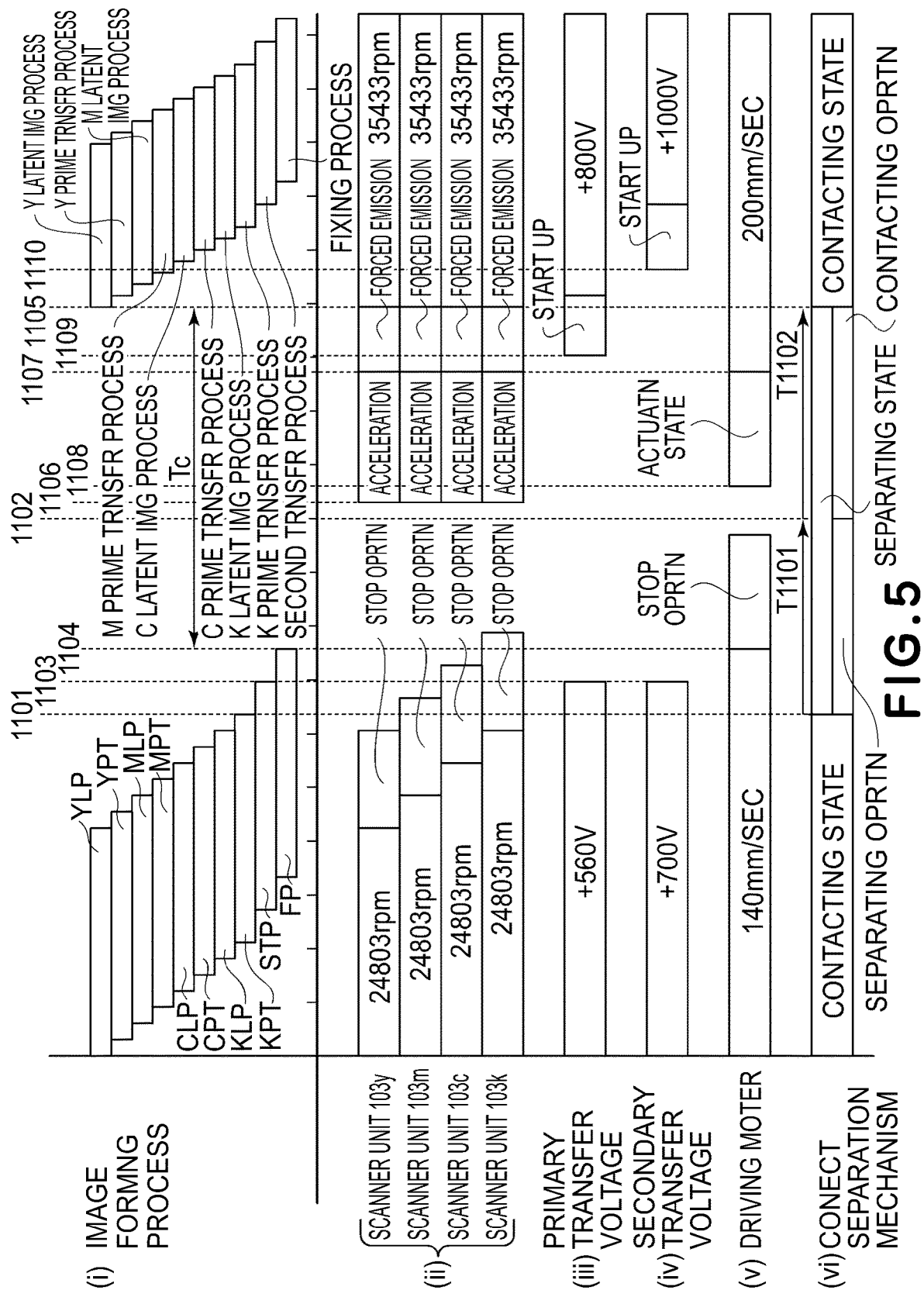
FIG. 5 is a timing chart indicates a conventional switching operation to be compared with the embodiment 1.

The effect of the embodiment 1 will be described. To be compared, the chart in FIG. 5 which shows the conventional switching operation of the process speed is used for the description. From (i) to (vi) in the chart in FIG. 5 correspond to from (i) to (vi) in the chart in FIG. 4. The switching operation of the process speed starts at the timing 1101 when the first transfer process of black is completed as the starting point. First off, the operation of developing and separating starts at the timing 1101 when the first transfer process of black is completed and ends at the timing 1102 when the time T1101 has passed. During this time the first transfer voltage and the second transfer voltage are operated to pause toward the timing 1103 which the second transfer process is completed. The driving motor 120 is operated to pause toward the timing 1104 which the fixing process is completed. On the other hand, the operation of developing and contacting starts at the timing 1102 when the operation of developing and separating ends, and ends at the timing 1105 when the time T1102 has passed since the timing 1102.

To prepare for the image forming of the plain paper, at the timing 1106 the scanner motor 303 starts to drive in advance in order to complete the forced emission (to reach to the targeted number of rotations by the timing 1105 which the developing contact operation is completed. Also, at the timing 1108 the driving motor 120 starts to drive in order to reach to the required speed by the timing 1107 which the forced emission starts (starting operation).

The image forming process of the plain paper starts at the timing 1105 when the developing contact operation is completed. The first transfer voltage starts to be applied a voltage in advance at the timing 1109 in order to reach to the required voltage (for example, +800 v) by the start of the first transfer process of yellow. Also, the second transfer voltage starts to be applied a voltage in advance at the timing 1110 in order to reach to the required rotational speed (for example, +1,000 v) by the start of the second transfer process. Therefore, the switching time Tc of a conventional operation from the timing 1104 to the timing 1105 is 3.2 seconds (>0.9 seconds).

As described above, by switching the number of rotations of the scanner motor 303 in the state the developing roller 104 is contact on, the switching time Tc is able to be shortened from 3.2 seconds to 0.9 seconds. Therefore, the pausing of the driving motor 120 and/or the operation of the contact/separation developing are not necessary in the case the process speed needed to switch during a continuous printing even on the different weight recording material S. Thus, the decline of productivity is minimized.

Modification 1

In the embodiment 1, the switching operation in which the targeted number of rotations increases was described. However, the effect of present invention is not limited within the case the number of rotations increases. For example, the same effect is able to be obtained in the switching operation in which the targeted number of rotations decreases as well. The above similarly applies to the other embodiments as it does to embodiment 1.

Modification 2

In the embodiment 1, a cleaning means of a intermediate transfer member was described with the example which a cleaning blade is provided as a structure. However, the shortening the time of switching operation which is the effect of present invention can be obtained in the other structure than the cleaning blade. For example, the structure which the toner image is transferred onto the photosensitive drum in the first transfer member and then an image carrier cleaning means removes the toner after a charging brush which is contact on the intermediate transfer belt removes the electricity from the toner image can obtain the same effect. The image carrier cleaning means may be either the structure is the cleaning blade in the embodiment 1 or the cleaner-less structure which the developing roller collects the toner. The above similarly applies to the other embodiments as it does to embodiment 1.

Modification 3

In the embodiment 1, the example which a separating means is provided between the developing roller 104 and the photosensitive drum 101 was described. However, the shortening the time of switching operation which is the effect of present invention can be obtained in spite of a separating means is provided or not. Because during the switching operation a separating means is not operated and does not affect the switching operation even if the separating means is provided or not. Even if the present invention is applied to the image forming apparatus which does not includes the separating means, the effect of shortening switching operation can be obtained because pausing and restarting are omitted. The above similarly applies to the other embodiments as it does to embodiment 1.

As described above, according to the embodiment 1, the duration time of the operation to switch the number of rotations of the scanner motor with the forced emission can be shortened.

In the embodiment 2, a direct transfer multi-color image forming apparatus of a tandem style in which a multi-color image is formed on the recording material S fed by a static carrier belt with transferring a toner image directly on the photosensitive drum 101 will be described.

Description of an Apparatus

Figure 6:
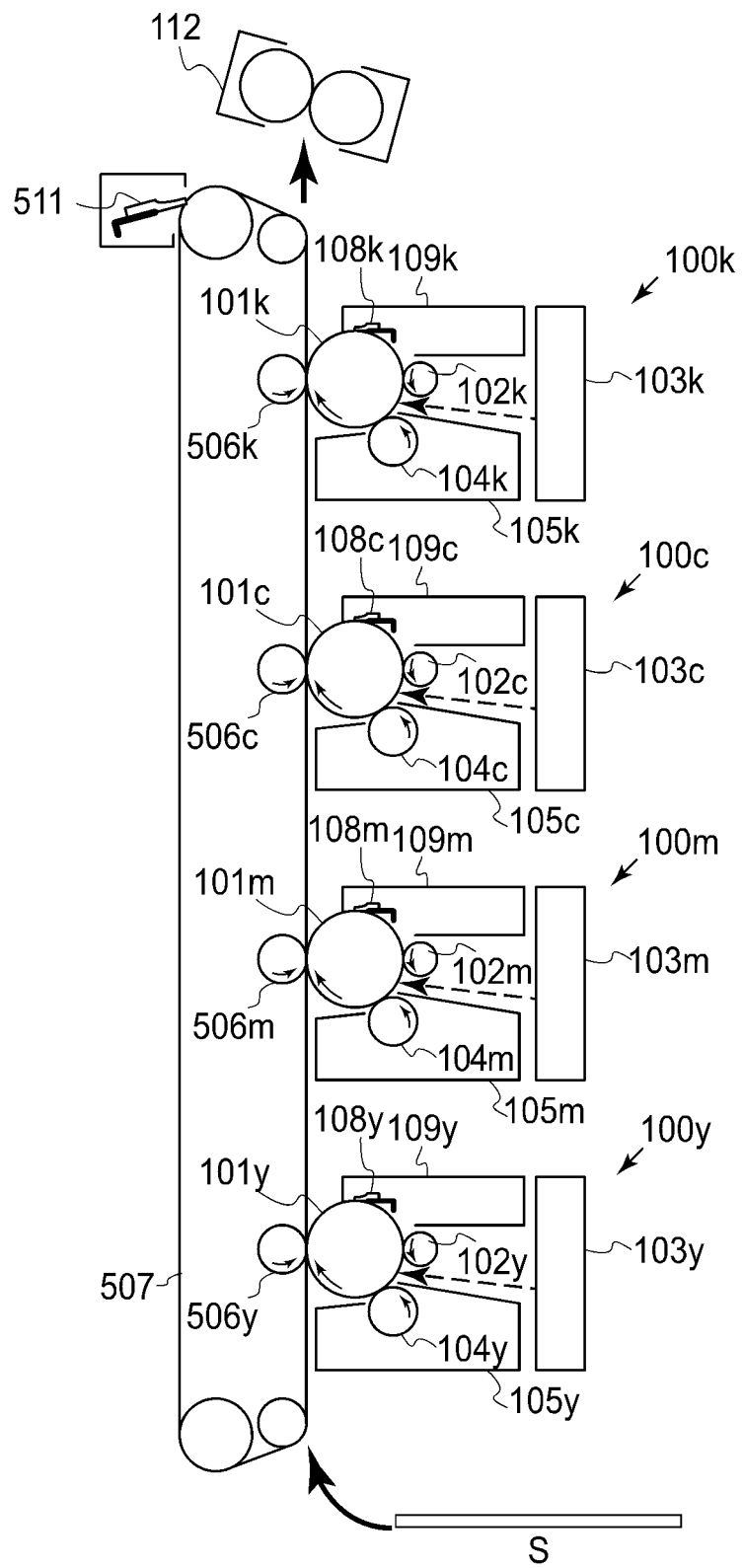
FIG. 6 is a cross sectional view of the main part of an image forming apparatus according to embodiment 2.

The structures and the operations of the cartridge 100 and the scanner unit 103 in the embodiment 2 are same as the embodiment 1. The structures and the operations which are different from the embodiment 1 will be described with FIG. 6. In the embodiment 2, a toner image formed on the photosensitive drum 101 is directly transferred by a transferred voltage which applied to a transfer roller 506 as a transfer means (transfer member) onto the recording material S which is one of a nipping and feeding member sticked and carried by a feeding belt 507 as a feeding carrier member which is one of the nipping and feeding member. The second transfer roller is not provided in the structure, which is different from the embodiment 1, because the toner image is directly transferred onto the recording material S in the first transfer. The direct transfer process is operated in the order of each color and a multi-color image is formed on the recording material S. the recording material S formed a multi-color image on is separated from the feeding belt 507 and sent to a fixing container 112. Therefore, a multi-color image is fixed on the recording material S as a permanent image. Note that, on the feeding belt 507 a belt cleaning blade 511 as a first cleaning means is provided to remove toner which is put on the feeding belt 507 (carrier and feeding member).

Operation of Embodiment 2

Figure 7:
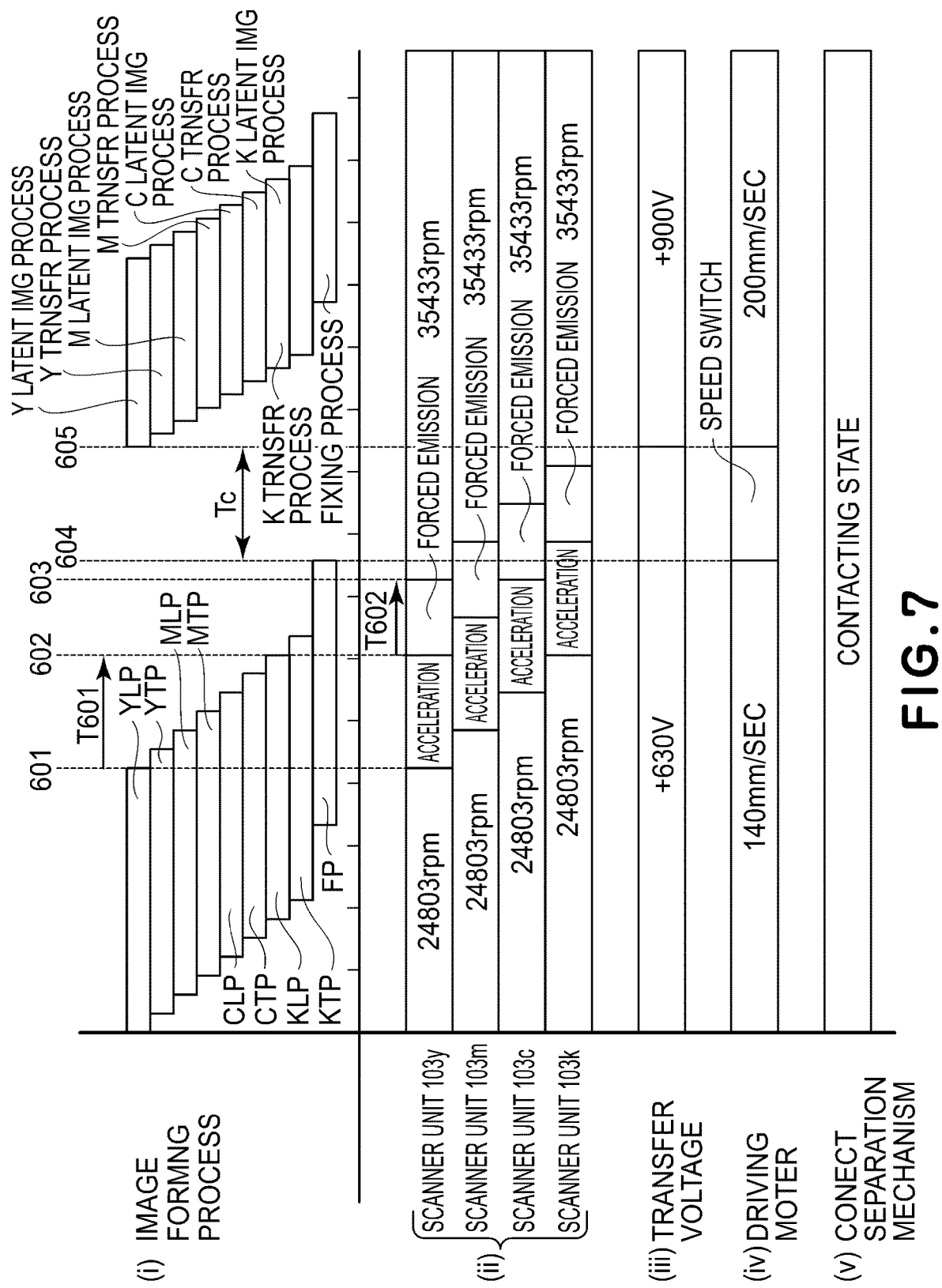
FIG. 7 is a timing chart indicates the switching operation according to the embodiment 2.

The switching operation of the process speed in the embodiment 2 will be described with a chart in FIG. 7.

The operation to switch number of rotations of the scanner motor with the forced emission without the separating operation between the photosensitive drum 101 and the developing roller 104 and/or pausing of the driving motor 120 during the continuous printing from on the thick paper to on the plain paper will be exemplary described. All operations in the embodiment 2 are same as the operations described in embodiment 1, except the second transfer process is omitted and the first transfer process is replaced the transfer process which the toner image is directly transferred on the recording material S.

The operation of switching process speed starts at the timing 601 when the latent process of yellow ends. First, at the timing 601 when the latent process of yellow ends the rotational speed of the scanner motor 303y is accelerated from 24803 rpm to 35433 rpm. At the timing 602 when the time T601 has passed since the acceleration starts at the timing 601 the forced emission is started. At the timing 603 when the time T602 has passed since the timing 602 which the forced emission is started the scanner motor 303 reaches to the targeted rotational speed 35433 rpm and the forced emission ends. Followed same operation by in order of magenta, cyan, and black as well. The driving motor 120 starts acceleration to switch the process speed to 200 mm/s at the timing 604 when the fixing process onto the thick paper is completed (switching speed).

On the other hand, the develop roller 104 and the photosensitive drum 101 are in contact with each other so that a toner image is formed on the photosensitive drum 101y by the forced emission from the timing 602 which the forced emission by the scanner motor 103y starts. During this time the first transfer voltage (for example +630 v) that is same polarity with the voltage applied to form an image on the thick paper is applied to the first transfer roller 506. Thus, the formed toner image is transferred to the feeding belt 507 The transferred toner image is removed by the belt cleaning blade 511. The image forming process of the plain paper starts at the timing 605 when the driving motor 120 completes switching speed. In the embodiment 2 the switching time Tc is 0.9 seconds. Note that, the transfer voltage in the transfer process of the plain paper is +900 v.

The Effect of the Embodiment 2

Figure 8:
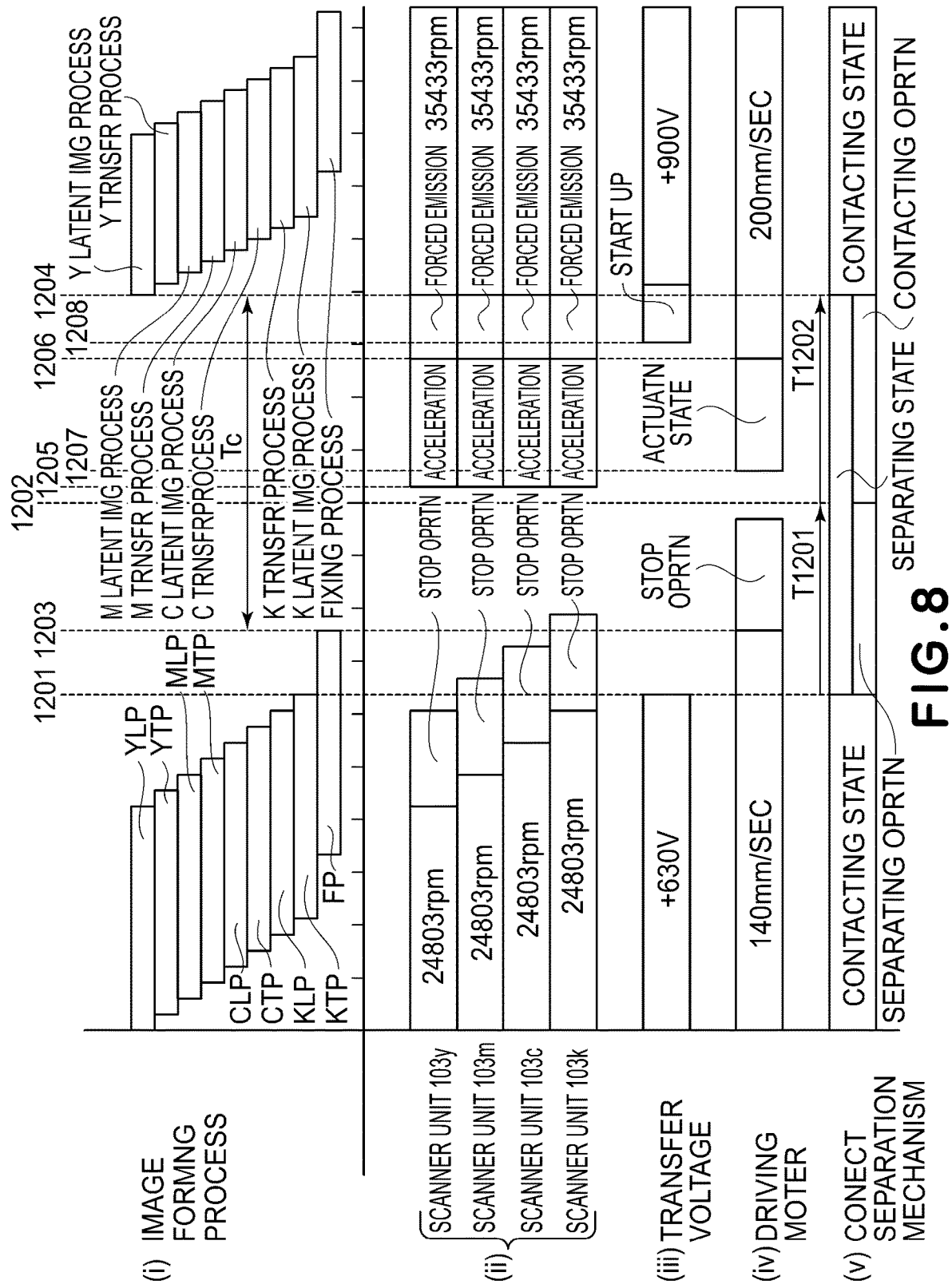
FIG. 8 is a timing chart indicates the conventional switching operation to be compared with the embodiment 2.

The effect of the embodiment 1 will be described. To be compared, the chart in FIG. 8 which shows the conventional switching operation of the process speed is used for the description. All operations are same as the conventional operations described in the embodiment 1, except the second transfer process is omitted and the first transfer process is replaced the transfer process which the toner image is directly transferred on the recording material S.

The switching operation of the process speed starts at the timing 1201 when the transfer process of black is completed as the starting point. The operation of developing and separating starts at the timing 1201 when the transfer process of black is completed and ends at the timing 1202 when the time T1201 has passed. The transfer voltage is operated to pause toward the timing 1201 which the transfer process is completed. The driving motor 120 is operated to pause toward the timing 1203 which the fixing process is completed.

On the other hand, the operation of developing and contacting starts at the timing 1202 when the operation of developing and separating ends, and ends at the timing 1204 when the time T1202 has passed. To prepare for the image forming of the plain paper, at the timing 1205 the scanner motor 303 starts to drive (acceleration) in advance in order to complete the forced emission by the timing 1204 which the developing contact operation is completed. Also, at the timing 1207 the driving motor 120 starts to drive in order to reach to the required speed (200 mm/s) by the timing 1206 which the forced emission starts (starting operation). Note that, the transfer voltage in the transfer process of the thick paper is +630 v.

The image forming process of the plain paper starts at the timing 1204 when the developing contact operation is completed. The transfer voltage starts to be applied a voltage in advance at the timing 1208 in order to reach to the required voltage (for example, +900 v) by the transfer process of yellow starts. The switching time Tc of a conventional operation is 3.2 seconds (>0.9 seconds).

As described above, by switching the number of rotations of the scanner motor 303 in the state the developing roller 104 is contact on, the switching time Tc is able to be shortened from 3.2 seconds to 0.9 seconds. Therefore, the pausing of the driving motor 120 and/or the operation of the contact/separation developing are not necessary in the case the process speed needed to switch during a continuous printing even on the different weight recording material S. Thus, the decline of productivity is minimized.

Modifications

In the embodiment 2 the structure of a feeding belt cleaning means which is a cleaning blade was described. However, the shortening switching operation which is the effect of present invention can be obtained in the other structure than the cleaning blade. For example, a structure that removes the toner by applying a cleaning voltage to a collecting brush which is in contact to the feeding belt is possible.

As described above, according to the embodiment 2, the duration time of the operation to switch the number of rotations of the scanner motor 303 with the forced emission can be shortened more.

In the embodiment 3 the example which present invention is applied to a single-color image forming apparatus provided the contact developing method which the formed toner image on the photosensitive drum 101 is directly transferred onto the recording material S to form a single-color image will be described. As a feature of the embodiment 3, the operation is executed not to transfer the toner image on the photosensitive drum 101 to the next process members.

Description of an Apparatus

The structures and the operations of the cartridge 100 and the scanner unit 103 in the embodiment 3 are same as the embodiment 1 and 2. The structures and the operations which are different from the embodiment 1 and 2 will be described with FIG. 9. In the embodiment 3, a toner image formed on the photosensitive drum 101 is directly transferred by the transfer voltage which applied to a transfer roller 706 as a transfer means (transfer member) onto the recording material S which is one of the nipping and feeding member. The recording material S formed a single-color image is sent to the fixing container 112. Thus, a single-color image is fixed as a permanent image. To the transfer roller 706 the transfer voltage is applied from a transfer voltage source 150 as an applying voltage means. Note that, the transfer voltage source 150 is able to apply both a positive polarity voltage and a negative polarity voltage.

Operations of the Embodiment 3

The switching operation of the process speed in the embodiment 3 will be described with a chart in FIG. 10. The operation to switch number of rotations of the scanner motor 303 with the forced emission without the separating operation between the photosensitive drum 101 and the developing roller 104 and/or pausing of the driving motor 120 during the continuous printing from on the thick paper to on the plain paper will be exemplary described. All operations in the embodiment 3 are same as the operations described in embodiment 2, except the multi-color transfer process is omitted.

The operation of switching process speed starts at the timing 801 when the latent process is completed. First, at the timing 801 when the latent process ends the rotational speed of the scanner motor 303 starts acceleration from 24803 rpm to 35433 rpm. At the timing 802 when the time T801 has passed since the acceleration starts at the timing 801 the forced emission is started. At the timing 803 when the time T802 has passed since the timing 802 which the forced emission is started the scanner motor 303 reaches to the targeted rotational speed 35433 rpm and the forced emission ends. The driving motor 120 starts acceleration to switch the process speed to 200 mm/s at the timing 804 when the fixing process onto the thick paper is completed (switching speed).

On the other hand, the develop roller 104 and the photosensitive drum 101 are in contact with each other so that a toner image is formed on the photosensitive drum 101 by the forced emission. At the timing 805 when the time T801 has passed since the timing 802 which the forced emission starts a toner image reaches to the transfer roller 706. If the same polarity voltage is kept applying as the voltage to form an image, the toner is put on the transfer roller 706 which is the next process member and will be a contamination back side on the plain paper which will be printed next. To avoid above, the timing 805 which the toner image reaches to the transfer roller 706, the opposite polarity voltage of the voltage applied to form an image is applied. By applying an opposite voltage, toner deposition on the second transfer roller 110 is prevented. The voltage applied is not limited within the value in the embodiment 3, but is possible within the value the toner image is not transferred to the transfer roller 706. A toner image keeps moving on to reach to the transfer roller 706 from the timing 803 which the forced emission ends to the timing 806 which the time T804 has passed. Therefore, between the timing 805 and the timing 806 the opposite polarity voltage is necessary to keep on being applied. In the other word, during the toner image on the photosensitive drum 101 passes by the transfer roller 706, the opposite polarity voltage is necessary to keep on being applied. The toner image which passed by the transfer roller 706 is collected by the drum cleaning blade 108 as a second cleaning means. The image forming process of the plain paper starts at the timing 807 when the switching operation of the driving motor 120 is completed. And then the image forming proceeds to the latent process, the transfer process, and the fixing process. In the embodiment 3 the switching time Tc is 0.9 seconds.

Effect of the Embodiment 3

Figure 11:
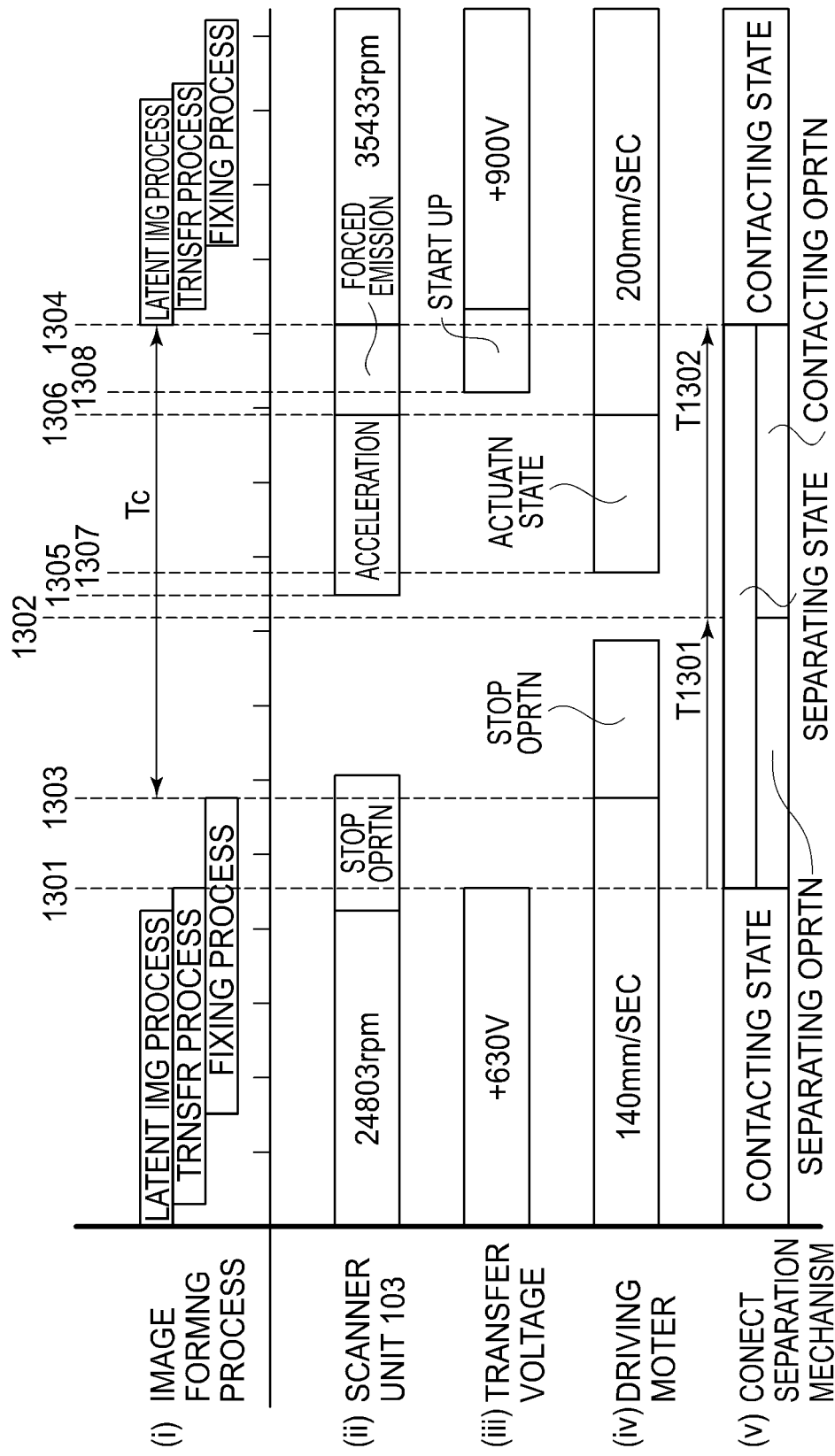
FIG. 11 is a timing chart indicates the conventional switching operation to be compared with the embodiment 3.

The effects of the embodiment 3 will be described. To be compared, the chart in FIG. 11 which shows the conventional switching operation of the process speed is used for the description. All operations are same as the conventional operations described in the embodiment 2, except the multi-color transfer process is omitted. The switching operation of the process speed starts at the timing 1301 when the transfer process is completed as the starting point. The operation of developing and separating starts at the timing 1301 when the transfer process is completed and ends at the timing 1302 when the time T1301 has passed. The transfer voltage is operated to pause toward the timing 1301 which the transfer process is completed. The driving motor 120 is operated to pause toward the timing 1303 which the fixing process is completed. On the other hand, the operation of developing and contacting starts at the timing 1302 when the operation of developing and separating ends, and ends at the timing 1304 when the time T1302 has passed. To prepare for the image forming of the plain paper, at the timing 1305 the scanner motor 303 starts to drive (acceleration) in advance in order to complete the forced emission by the timing 1204 which the developing contact operation is completed. Also, at the timing 1307 the driving motor 120 starts to drive in order to reach to the required speed (for example, 200 mm/s) by the timing 1306 which the forced emission starts (starting operation).

The image forming process of the plain paper starts at the timing 1304 when the developing contact operation is completed. The transfer voltage starts to be applied a voltage in advance at the timing 1308 in order to reach to the required voltage (+900 v) by the transfer process starts. The switching time Tc of a conventional operation is 3.2 seconds (>0.9 seconds).

As described above, by switching the number of rotations of the scanner motor 303 in the state the developing means is contact on, the switching time Tc is able to be shortened from 3.2 seconds to 0.9 seconds. Therefore, the pausing of the driving motor 120 and/or the operation of the contact/separation developing are not necessary in the case the process speed needed to switch during a continuous printing even on the different weight recording material S. Thus, the decline of productivity is minimized.

Modification 1

In the embodiment 3 the operation which executes not to transfer a toner image with the forced emission from the photosensitive drum 101 onto the transfer roller 706 which is the next process member in the single-color image forming apparatus was exemplary described. The operation which executes not to transfer the toner image to the next process members is possible to apply either the multi-color image forming apparatus in the embodiment 1 or 2.

Modification 2

In the embodiment 3 the example which the structure of the image carrier cleaning means is a cleaning blade was described. However, the shortening switching operation which is the effect of present invention can be obtained with the other structure than the cleaning blade. For example, a structure in which the developing roller 104 collects the toner after it is removed by the charging roller 102 that is in contact to the photosensitive drum 101 is possible. The above similarly applies to the other embodiments as it does to embodiment 3.

As described above, according to the embodiment 3, the duration time of the operation to switch the number of rotations of the scanner motor with forced emission can be shortened more.

A single-color image forming apparatus applying the present invention will be shown. This single-color image forming apparatus is operated by the contact developing method that forms a single-color image by transferring the toner image formed on the photosensitive drum 101 onto the recording material S directly. The embodiment 4 is characterized that the embodiment 4 executes to suppress the toner developing by the forced emission.

Description of the Apparatus

Figure 9:
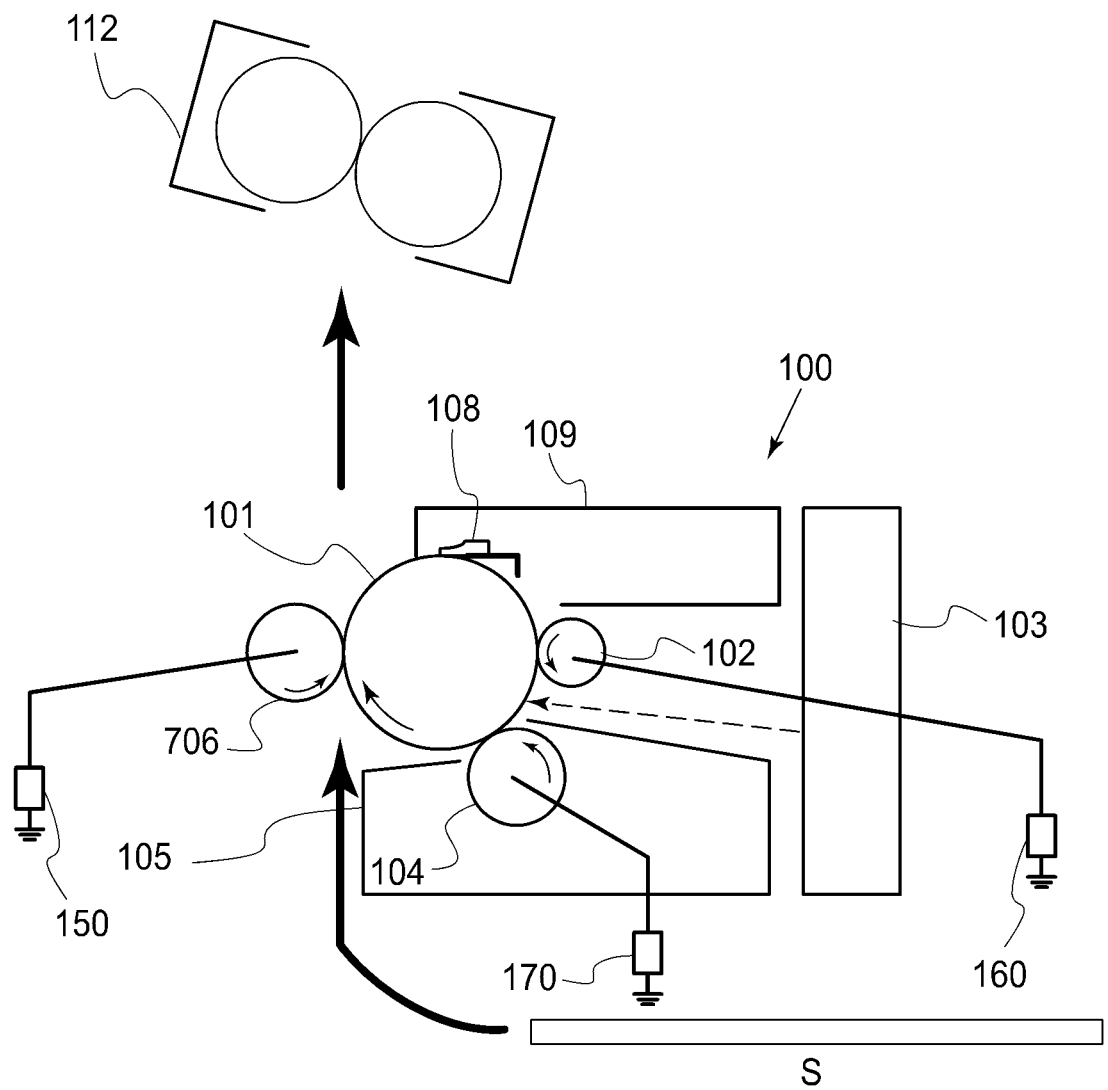
FIG. 9 is a cross sectional view of the main part of an image forming apparatus according to embodiment 3.

All structures and operations in the embodiment 4 are same as the structures and operations described in embodiment 3 in FIG. 9, except that the charging voltage is operated to remove the static charge from an image carrier member with a weakly charged voltage as a removing static charge means. The descriptions of the same structures and operations are omitted. As shown in FIG. 9, the charging roller 102 as a charging means (charging member) is applied a charging voltage from the charging voltage source 160 as a charging voltage applying means (a charging voltage applying portion). Also, the developing roller 104 as a developing means is applied a developing voltage from a developing voltage source 170 as a developing voltage applying means (a developing voltage applying portion). Note that, the developing voltage source 170 is able to apply both a positive polarity voltage and a negative polarity voltage.

Operation of Embodiment 4

Figure 12:
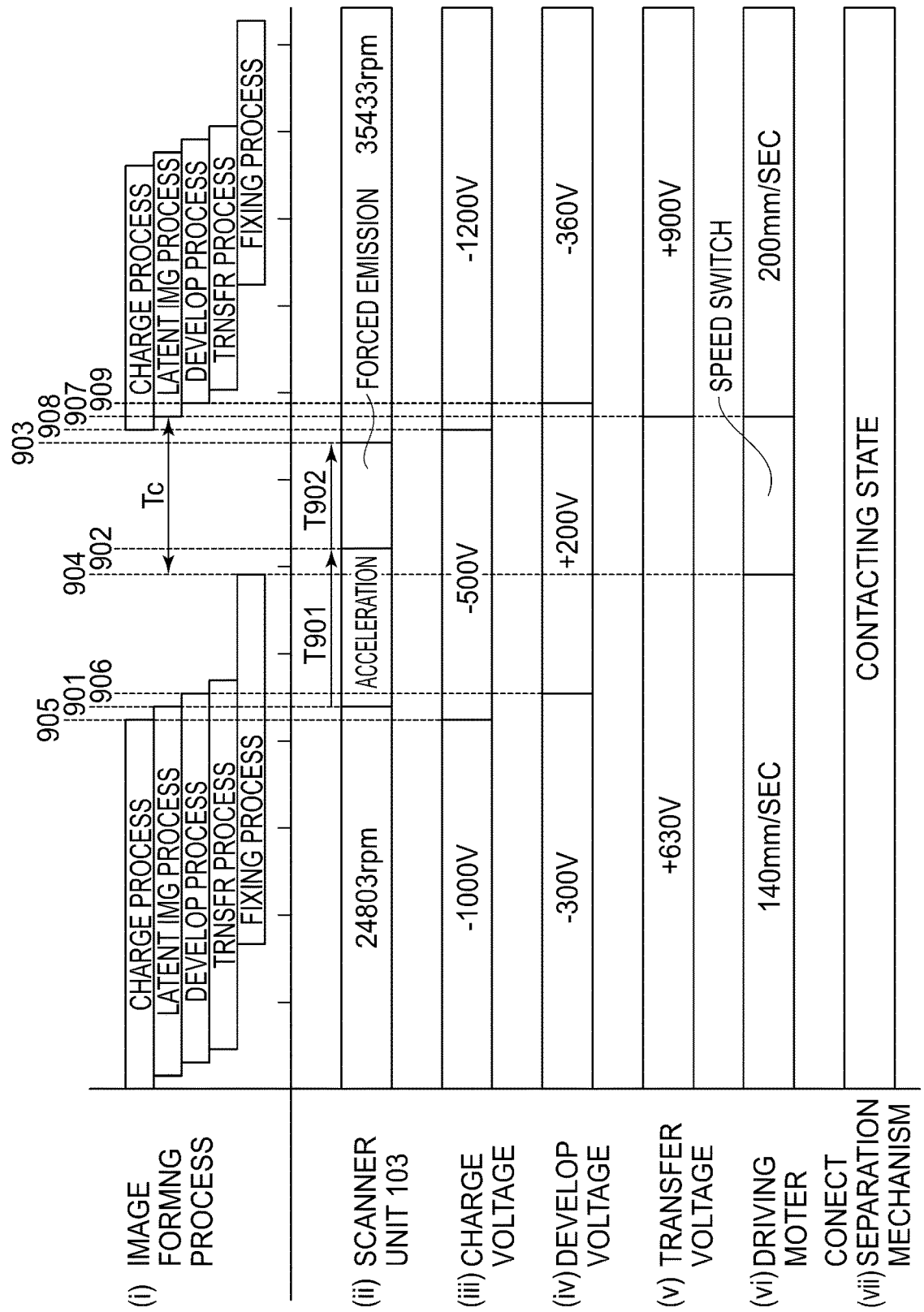
FIG. 12 is a timing chart indicates the switching operation according to the embodiment 4.
Figure 13:
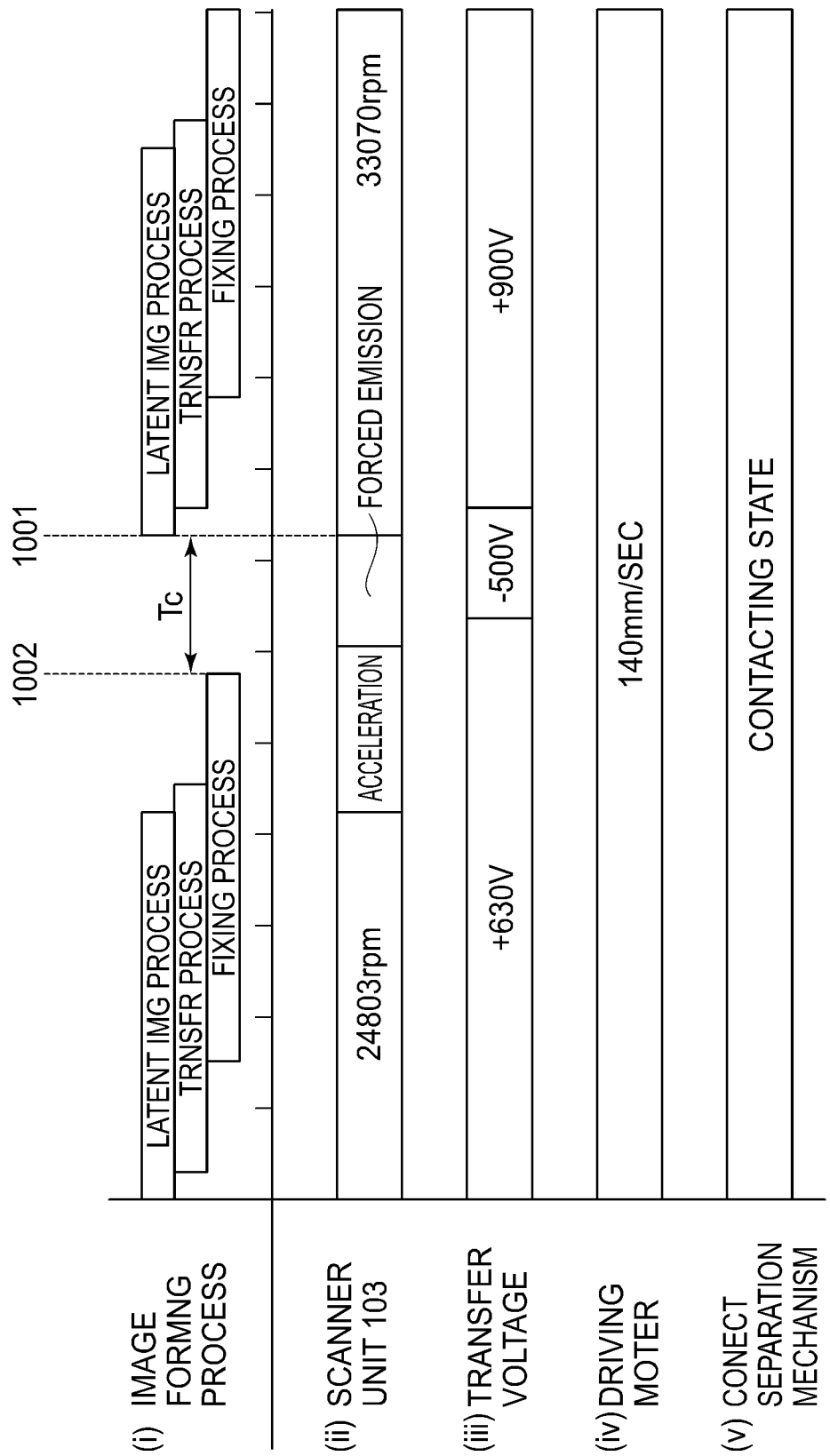
FIG. 13 is a timing chart indicates the switching operation according to the embodiment 5.

The operation to switch number of rotations of the scanner motor 303 with the forced emission without the separating operation between the photosensitive drum 101 and the developing roller 104 and/or pausing of the driving motor 120 during the continuous printing from on the thick paper to on the plain paper will be exemplary described with the chart in FIG. 12. Note that, in the chart in FIG. 12 the charging process and the developing process which are omitted in the embodiments 1-3 are added. The charging process is shown in (iii) and the developing process is shown in (iv).

The operation of switching process speed starts at the timing 901 when the latent process is completed. First, at the timing 901 when the latent process ends the rotational speed of the scanner motor 303 starts acceleration from 24803 rpm to 35433 rpm. At the timing 902 when the time T901 has passed since the acceleration starts at the timing 901 the forced emission is started. At the timing 903 when the time T902 has passed since the timing 902 which the forced emission is started the scanner motor 303 reaches to the targeted rotational speed 35433 rpm and the forced emission ends. The driving motor 120 starts acceleration (switching speed) to 200 mm/s at the timing 904 when the fixing process onto the thick paper is completed. A laser light by the forced emission is exposed on the photosensitive drum at the timing 902 the scanner motor 303 starts the forced emission.

The charging voltage is switched to the weakly charged voltage below a discharging threshold (for example, −500 v) at the timing 905 when the charging process is completed. Therefore, the surface of the photosensitive drum 101 becomes in the state removed the static charge up to almost 0 v. On the other hand, the developing voltage is switched to the opposite polarity voltage (+200 v) against the voltage (−300 v) during an image forming at the timing 906 when the developing process is completed. Therefore, the toner developing from the developing roller 104 to the photosensitive drum 101 is suppressed. By both the charging process and the developing process, the suppression of the toner deposition on the photosensitive drum by the forced emission comes to be possible. Thus, the contamination on the backside by the toner deposition is suppressed without applying an opposite polarity voltage to the transfer roller 706 against the voltage applied during the image forming. Note that, the charging voltage and the developing voltage are examples. The weakly charged voltage is possible to be within the value can keep the state removed electricity and the developing voltage is possible to be within the value can suppress the toner developing.

The latent process of the plain paper starts at the timing 907 when the switching speed of the driving motor 120 is completed. The charging voltage is switched to the voltage (−1200 v) which is the voltage applied during an image forming toward the timing 908 which the charging process of the plain paper. Thus, the charging voltage source 160 applies the voltage below the threshold that makes discharge in between the photosensitive drum 101 onto the charging roller 102 during the time between the charging operation to execute the image forming operation of the thick paper is completed and the time the charging operation to execute the image forming operation of the plain paper is started.

Also, the developing voltage is switched to the voltage applied during an image forming toward the timing 909 which the developing process starts. Thus, the developing voltage source 170 applies the opposite polarity voltage onto the developing roller 104 against the voltage applied in an image forming between the time from the charging operation to execute the image forming operation of the thick paper is completed and the time the charging operation to execute the image forming operation of the plain paper is started. In the embodiment 4 the switching time Tc is 0.9 seconds. Note that, the charging voltage in the charging process of the thick paper is −1000 v.

Effects of the Embodiment 4

The effect of the embodiment 4 will be described. The conventional operations to compare are same as the conventional operations shown in the embodiment 3 in FIG. 11. The duration of the switching operation time Tc is 3.2 seconds. The duration of the switching operation time in the embodiment 4 is 0.9 seconds, so that the shortening the switching operation time can be achieved by the operations in the embodiment 4, either.

As applying embodiment 4, by the suppression the toner development onto the photosensitive drum 101 even with the forced emission, the effect of the shortening of the switching operation which is the effect of the present invention can be obtained.

As described above, by switching the number of rotations of the scanner motor in the state the developing means is contact on, the switching time Tc is able to be shortened from 3.2 seconds to 0.9 seconds. Therefore, the pausing of the driving motor 120 and/or the operation of the contact/separation developing are not necessary in the case the process speed needed to switch during a continuous printing even on the different weight recording material S. Thus, the decline of productivity is minimized.

Modification 1

In the embodiment 4 the operation which suppresses to develop the toner with the forced emission in s single-color image forming apparatus was exemplary described. However, the operation which suppresses to develop the toner with the forced emission in a single-color image forming apparatus can be similarly applied to a multi-color image forming apparatus shown in the embodiment 1 or 2.

Modification 2

In the embodiment 4 the structure with the weakly charged voltage as a charge removing means to remove the static charge from an image carrier was exemplary described. However, the operation which suppresses to develop the toner can be similarly applied not limited within the means in the embodiment 4. For example, the structure provided with a removing charge light or a removing charge brush and/or the removing charge with the transfer means are possible. The above similarly applies to the other embodiments as it does to embodiment 4.

As described above, according to the embodiment 4, the duration time of the operation to switch the number of rotations of the scanner motor with forced emission can be shortened more.

In the embodiment 5 the example which present invention is applied to an image forming apparatus provided a contact developing method which the formed toner image on the photosensitive drum 101 is directly transferred onto the recording material S to form a single-color image will be described. As a feature of the embodiment 5, the number of rotations of the scanner motor 303 is executed not by switching the process speed but by switching the resolution.

Description of an Apparatus

The structures and the operations of the cartridge 100 and the scanner unit 103 in the embodiment 5 are same as the embodiment 3. As operating, the image forming apparatus is operated with two modes, one is a high-quality mode in which is operated with 400 dpi resolution as a second resolution and other is a normal quality mode in which is operated with 300 dpi as a first resolution. At this time the number of rotations of the scanner motor 303 are 33070 rpm in the high-quality mode and 24803 rpm in the normal resolution mode. Note that, both modes are operated at the process speed 140 mm/second.

Operation of the Embodiment 5

The operation to switch the resolution in the embodiment 5 will be described with the chart in FIG. 12. The operation to switch number of rotations of the scanner motor 303 with the forced emission without the separating operation between the photosensitive drum 101 and the developing roller 104 and/or pausing of the driving motor 120 during the continuous printing from the normal quality mode to the high-quality mode will be exemplary described.

Figure 10:
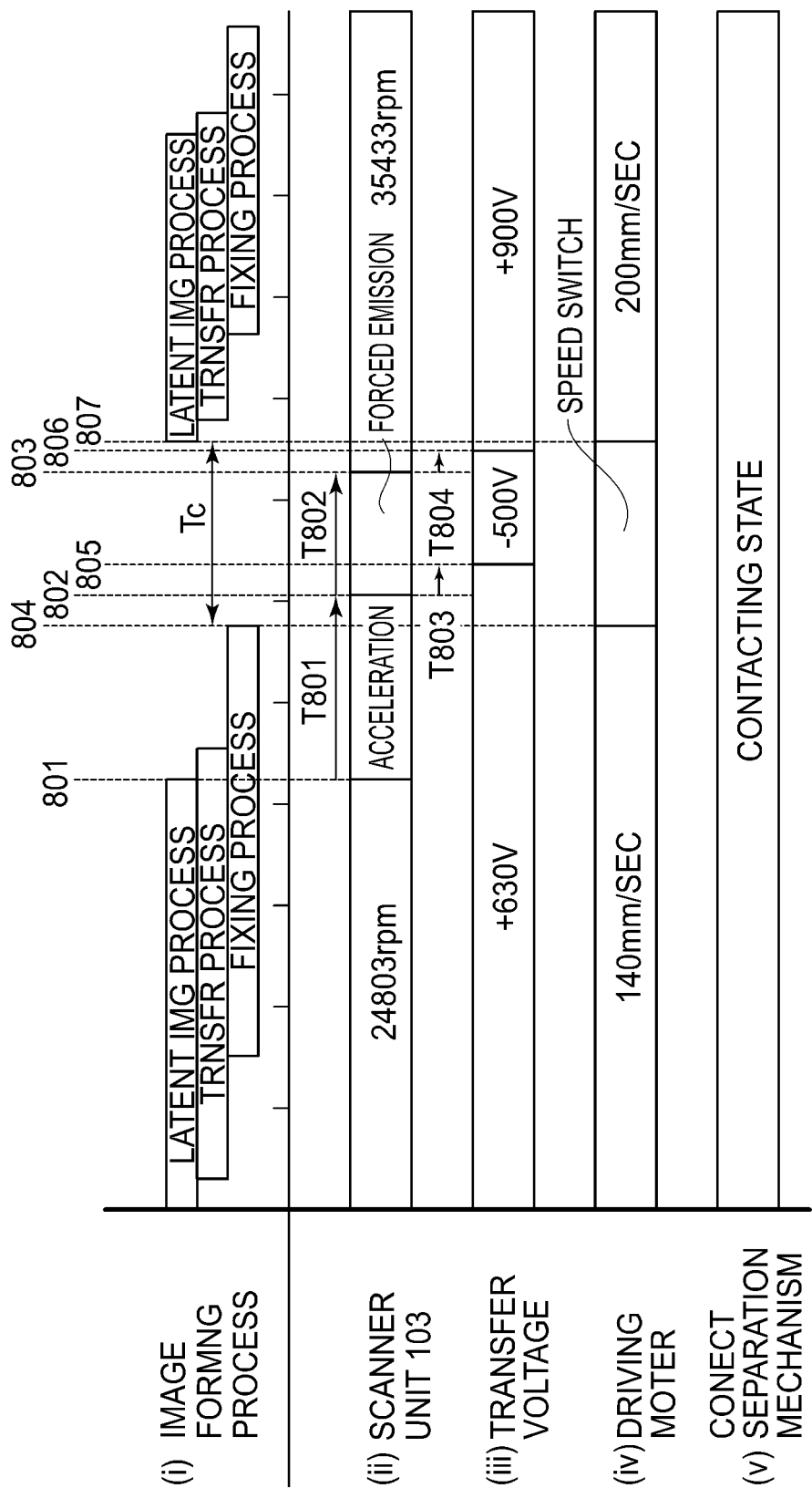
FIG. 10 is a timing chart indicates the switching operation according to the embodiment 3.

The point that process speed is not changed before and after the switching operation differs from the chart in FIG. 10 in the embodiment 3. In the embodiment 3 the latent process starts after switching number of rotations of scanner motor 303 as waiting until the switching process speed is completed (the timing 807). However, the timing 1001 which the latent process starts after switching the number of rotations of the scanner motor 303 is necessary to wait until the forced emission ends even if the process speed is not changed. Therefore, the duration time Tc between the timing 1002 which the fixing process ends before switching the number of rotations of the scanner motor 303 and the timing 1001 when the latent process starts is rate-determining by the switching speed of the scanner motor 303. The switching time Tc in the embodiment 5 is 0.7 seconds.

Effect of the Embodiment 5

The effect of the embodiment 5 is the shortening the switching time as same as the other embodiments. The switching time Tc in the conventional operation to compare is 3.2 seconds which is same as the switching time Tc in the conventional operation described in the embodiment 3. As the operation in the embodiment 5, even the switching operation which only the number of rotations of the scanner motor 303 is switched without changes of the process speed can be obtained the effect of the shortening the switching time which is the effect of the present invention.

As described above, by switching the number of rotations of the scanner motor 303 in the state the developing roller 104 is contact on, the switching time Tc is able to be shortened from 3.2 seconds to 0.9 seconds. Therefore, the pausing of the driving motor and/or the operation of the contact/separation developing are not necessary even in the case the resolution needed to switch during a continuous printing. Thus, the decline of productivity is minimized.

As described above, according to the embodiment 5, the duration time of the operation to switch the number of rotations of the scanner motor with forced emission can be shortened more.

According to the present invention, the duration time of the operation to switch the number of rotations of the scanner motor with forced emission can be shortened more.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-106948, filed Jun. 28, 2021, which is hereby incorporated by reference herein in its entirety.

What is claimed is:

1. An image forming apparatus comprising:
a scanner provided with a light source, a rotating polygon mirror for deflecting a laser light emitted from said light source, and a first driving motor for driving rotation of said rotating polygon mirror;
a photosensitive member on which an electrostatic latent image is formed by the laser light emitted from said scanner;
a developing member for developing the electrostatic latent image formed on said photosensitive member with toner to form a toner image;
a detector for detecting the laser light;
an intermediate transfer member on which the toner image, formed on said photosensitive member by said developing member, is transferred;
a primary transfer member for transferring the toner image to said intermediate transfer member;
a secondary transfer member for transferring the toner image on said intermediate transfer member to a recording material;
a secondary transfer voltage applying portion for applying a voltage to said secondary transfer member; and
a controller for controlling said scanner the first driving motor and the secondary transfer voltage applying portion,
wherein said controller controls said light source to execute a light emission operation so that an area including an image forming area of said photosensitive member is irradiated with the laser light emitted from said light source,
wherein said controller controls said first driving motor to execute a switching operation in which a rotational speed of said rotating polygon mirror is switched from a first rotational speed to a second rotational speed different from the first rotational speed,
wherein said controller controls said light source to execute the light emission operation in a state in which said photosensitive member and said developing member are in contact with each other and are rotating, and said controller controls to execute the switching operation based on a detecting result of said detector in the light emission operation, and
wherein said controller further controls said secondary transfer voltage applying portion to apply the voltage, of which a polarity is opposite to a polarity of the voltage applied by said secondary transfer voltage applying portion in the image forming operation, to said secondary transfer member during a period when the toner image, on said intermediate transfer member, formed when the light emission operation is executed passes through said secondary transfer member.

2. An image forming apparatus according to claim 1, wherein said photosensitive member and said developing member take a first state of contacting therewith and a second state of separating therefrom.

3. An image forming apparatus according to claim 1, further comprising:
a charging member for charging a surface of said photosensitive member;
a charging voltage applying portion for applying a charging voltage to said charging means; and
a developing voltage applying portion for applying a developing voltage to said developing member,
wherein said controller further controls said charging voltage applying portion to apply the charging voltage, of which a value is equal to or lower than a threshold at which discharge between said photosensitive member and said charging voltage applying portion is generated, to said charging member during a period from a completion of a discharging operation by said charging member when an image formation operation is executed at the first rotational speed to a start of the discharging operation after switching to the second rotational speed, and
wherein said controller further controls said developing voltage applying portion to apply the developing voltage, of which a polarity is opposite to a polarity of the developing voltage applied by said developing voltage applying portion in the image forming operation, to said developing member during a period from a completion of a discharging operation by said charging member when the image formation operation is executed at the first rotational speed to a start of the developing operation after switching to the second rotational speed.

4. An image forming apparatus according to claim 1, further comprising:
a carrying and feeding member for carrying a recording material on which the toner image formed on photosensitive member by said developing member;
a transfer member for transferring the toner image to the recording material; and
a first cleaning member for cleaning the toner image, on said carrying and feeding member, formed when the light emission operation is executed.

5. An image forming apparatus according to claim 1, further comprising:
a transfer member for transferring the toner image, formed on said photosensitive member by said developing member, to the recording material; and
a transfer voltage applying portion for applying a voltage to said transfer member, wherein said controller further controls said transfer voltage applying portion to apply the voltage, of which a polarity is opposite to a polarity of the voltage applied by transfer voltage applying portion in the image forming operation, to said secondary transfer member during a period when the toner image, on said photosensitive member, formed when the light emission operation is executed passes through said transfer member.

6. An image forming apparatus according to claim 1, further comprising:
a second driving motor for driving said photosensitive member and said developing member,
wherein said controller controls said first driving motor to switch the first rotational speed to the second rotational speed when a process speed is switched from a first process speed to a second process speed different from the first process speed by said second driving motor.

7. An image forming apparatus according to claim 1, wherein said controller controls said first driving motor to switch the first rotational speed to the second rotational speed when a resolution is switched from a first resolution to a second resolution different from the first resolution.

8. An image forming apparatus comprising:
a scanner provided with a light source, a rotating polygon mirror for deflecting a laser light emitted from said light source, and a first driving motor for driving rotation of said rotating polygon mirror;
a photosensitive member on which an electrostatic latent image is formed by the laser light emitted from said scanner;
a developing member for developing the electrostatic latent image formed on said photosensitive member with toner to form a toner image;
a detector for detecting the laser light;
an intermediate transfer member on which the toner image, formed on said photosensitive member by said developing member, is transferred;
a primary transfer member for transferring the toner image to said intermediate transfer member;
a primary transfer voltage applying portion for applying a voltage to said primary transfer member; and
a secondary transfer member for transferring the toner image on said intermediate transfer member to a recording material,
wherein said controller controls said light source to execute a light emission operation so that an area including an image forming area of said photosensitive member is irradiated with the laser light emitted from said light source,
wherein said controller controls said first driving motor to execute a switching operation in which a rotational speed of said rotating polygon mirror is switched from a first rotational speed to a second rotational speed different from the first rotational speed,
wherein said controller controls said light source to execute the light emission operation in a state in which said photosensitive member and said developing member are in contact with each other and are rotating, and said controller controls to execute the switching operation based on a detecting result of said detector in the light emission operation, and
wherein said controller further controls said primary transfer voltage applying portion to apply the voltage, of which a polarity is opposite to a polarity of the voltage applied by said primary transfer voltage applying portion in the image forming operation, to said primary transfer member during a period when the toner image, on said photosensitive member, formed when the light emission operation is executed passes through said primary transfer member.

9. An image forming apparatus according to claim 8, wherein said photosensitive member and said developing member take a first state of contacting therewith and a second state of separating therefrom.

10. An image forming apparatus according to claim 8, further comprising:
a charging member for charging a surface of said photosensitive member;
a charging voltage applying portion for applying a charging voltage to said charging means; and
a developing voltage applying portion for applying a developing voltage to said developing member,
wherein said controller further controls said charging voltage applying portion to apply the charging voltage, of which a value is equal to or lower than a threshold at which discharge between said photosensitive member and said charging voltage applying portion is generated, to said charging member during a period from a completion of a discharging operation by said charging member when an image formation operation is executed at the first rotational speed to a start of the discharging operation after switching to the second rotational speed, and
wherein said controller further controls said developing voltage applying portion to apply the developing voltage, of which a polarity is opposite to a polarity of the developing voltage applied by said developing voltage applying portion in the image forming operation, to said developing member during a period from a completion of a discharging operation by said charging member when the image formation operation is executed at the first rotational speed to a start of the developing operation after switching to the second rotational speed.

11. An image forming apparatus according to claim 8, further comprising:
a carrying and feeding member for carrying a recording material on which the toner image formed on photosensitive member by said developing member;
a transfer member for transferring the toner image to the recording material; and
a first cleaning member for cleaning the toner image, on said carrying and feeding member, formed when the light emission operation is executed.

12. An image forming apparatus according to claim 8, further comprising:
a transfer member for transferring the toner image, formed on said photosensitive member by said developing member, to the recording material; and
a transfer voltage applying portion for applying a voltage to said transfer member,
wherein said controller further controls said transfer voltage applying portion to apply the voltage, of which a polarity is opposite to a polarity of the voltage applied by transfer voltage applying portion in the image forming operation, to said secondary transfer member during a period when the toner image, on said photosensitive member, formed when the light emission operation is executed passes through said transfer member.

13. An image forming apparatus according to claim 8, further comprising:

a second driving motor for driving said photosensitive member and said developing member,
wherein said controller controls said first driving motor to switch the first rotational speed to the second rotational speed when a process speed is switched from a first process speed to a second process speed different from the first process speed by said second driving motor.

14. An image forming apparatus according to claim 8, wherein said controller controls said first driving motor to switch the first rotational speed to the second rotational speed when a resolution is switched from a first resolution to a second resolution different from the first resolution.

\* \* \* \* \*